3,000,763
CELLULOSIC MATERIALS PLASTICIZED WITH HYDROXYPROPYLGLYCEROL
Arthur W. Anderson, George K. Greminger, Jr., Garth H. Beaver, and Samuel M. Rodgers, Jr., Midland, Mich., assignors to The Dow Chemical Company, Midland, Mich., a corporation of Delaware
No Drawing. Filed May 28, 1957, Ser. No. 662,005
2 Claims. (Cl. 117—144)

This invention relates to plasticized cellulosic materials. By the latter term we mean materials consisting primarily of cellulose, in either its natural or regenerated state, such as paper, cellophane, and the like.

Aliphatic polyhydroxy compounds, particularly glycerol, glycols and the like, have been widely used as plasticizers for cellulosic materials, especially for paper and cellophane. These compounds are fairly effective but have two major defects: they are mobile and volatile, and hence are easily lost by migration or evaporation; and they are excessively hygroscopic, and hence their effectiveness varies with the temperature and humidity of the surroundings.

Various attempts have been made to improve the properties of glycerol by esterifying or etherifying one or more of its hydroxyl groups, one of the most successful of such modifications being by oxyalkylation. Glycerol can be condensed with alkylene oxides, such as ethylene, propylene or butylene oxide, to produce polyoxyalkylated glycerols which have some utility as plasticizers for cellulosics. As produced heretofore, however, these products have found only limited use in this application because (1) they have been made and used as complex mixtures of compounds of varying degrees of oxyalkylation, both as to the number of the glycerol hydroxyl groups that have been oxyalkylated and as to the number of oxyalkyl groups that have been condensed on a given hydroxyl group, and (2) all such oxyalkylated glycerols heretofore available have contained significant amounts of compounds containing polyoxyalkylene chains. Plasticizers which are gross mixtures of molecular species are inherently undesirable because of the unavoidable variability of the material and the difficulty of duplicating the material from one batch to another. The presence of polyoxyalkylene chains is objectionable in a plasticizer to be used in common household items such as paper and cellophane because of their well known toxicity. Moreover, such groups, being substantially non-polar, add little or nothing to the plasticizing action of the compound in cellulosic materials.

Accordingly, it is an object of this invention to provide plasticized cellulosic materials wherein the plasticizer is less volatile, less subject to migration, less hygroscopic, less toxic and more uniform in composition than the previously used glycol and glycerol derivatives.

This and other objects are achieved by plasticizing the cellulosic material with 1,2,3-tris-(2-hydroxypropoxy)propane, hereinafter called hydroxypropylglycerol.

The hydroxypropylglycerol used in the practice of the invention may be made by any known method; for instance, by the reaction of chloroisopropanol with the sodium salt of glycerol. A preferred method for its production is that disclosed in the copending application of Arthur W. Anderson, Serial No. 630,067, filed December 24, 1956, now U.S. Patent No. 2,927,918. The product obtainable by the condensation of three moles of propylene oxide with one mole of glycerol in the presence of an alkali catalyst is of only limited used in our invention because it invariably contains a significant proportion of polyglycol derivatives which, as pointed out above, are highly undesirable for our purposes.

Hydroxypropylglycerol may be incorporated into cellulosic materials that are to be plasticized by any of the known techniques used in putting conventional plasticizers into such materials. Thus, in making cellophane, for instance, the wet, swollen sheet called the gel sheet may be passed through a bath of the plasticizer or, more commonly, of an aqueous solution of the plasticizer. The amount of plasticizer to be used, based on the finished product, may suitably vary from as little as 3% to as much as 30%, the preferred amount usually being in the range of 10–20% by weight. This pick-up can be conveniently regulated by adjustment of the concentration of plasticizer in the bath, the length of time the sheet is immersed in the bath, the effectiveness with which the excess is removed from the surface of the gel sheet, etc.

Hydroxypropylglycerol may be incorporated into paper by spraying it onto the wet or dry sheet at any convenient point in its manufacture or by passing the sheet through a bath of the plasticizer or an aqueous solution thereof, or by any other suitable means. As little as 3%, by weight, significantly improves the properties of paper, although we prefer to use 10 to 40%, or even up to 60%, depending largely on the type of paper.

Hydroxypropylglycerol is an effective plasticizer for cellulose ethers, such as ethylcellulose and methylcellulose, for which purpose it may be added directly to the cellulosic ether or to solutions thereof.

The practice of the invention is more particularly illustrated by the following examples.

EXAMPLE 1

Freshly prepared regenerated cellulose films of about 1.5 mils thickness were immersed in a 10% aqueous solution of hydroxypropylglycerol. After being drained and dried they were found to be softer, more flexible, and tougher than similar but unplasticized films and had an ultimate elongation of 23%, as compared to 16% for the unplasticized film. More highly plasticized films may be obtained by use of a more concentrated solution of plasticizer, or by use of the undiluted material.

EXAMPLE 2

Sheets of 27 lb. parchment paper were soaked for 10 minutes in aqueous solutions of hydroxypropylglycerol of concentrations chosen to give the desired degree of plasticizer pick-up. The excess solution was blotted from the sheets, after which they were dried in a drying frame for 15 minutes at 80° C. They were then conditioned at 75° F. and 50% relative humidity for 48 hour before being tested. Plasticizer pick-up was determined by weighing the conditioned sheets before and after impregnation with plasticizer.

Burst strength of the samples was determined by the Tappi Mullen Burst Test. Tensile strength was measured according to Tappi Standard T404–M–50 by use of the Instron Tester at a cross-head speed of 2 inches per minute with the gauge marks 5.5 inches apart. The specimens were 0.5 inch wide and the force was applied in the machine direction of the paper. Stiffness was determined by the Gurley Stiffness Tester, the samples being 1 inch by 1 inch and being placed so as to bend in the cross-machine direction. A 5 g. weight was used 2 inches from the center. Plasticizer permanence was measured by aging the sheets in an oven at 135° F. for 14 days and determining the weight loss. Some typical results of these tests are shown in the following table. The numerical values recorded are in each case averages of several replications of the test.

*Table I.—Properties of plasticized paper*

UNPLASTICIZED CONTROL

| Plasticizer Content, Percent | Tensile Strength, p.s.i. | Bursting Strength, p.s.i. | Stiffness, mg. | | Plasticizer Loss, Percent During Aging |
|---|---|---|---|---|---|
| | | | Initial | Aged | |
| 0 | 10,694 | 22.1 | 27.8 | 30.0 | 0 |

PLASTICIZED WITH GLYCEROL

| | | | | | |
|---|---|---|---|---|---|
| 3.4 | 9,140 | 25.1 | 32.2 | 26.7 | 0.6 |
| 5.6 | 8,093 | 23.4 | 26.7 | 28.4 | 0.5 |
| 11.3 | 6,789 | 21.8 | 21.7 | 29.5 | 4.3 |

PLASTICIZED WITH HYDROXYPROPYLGLYCEROL

| | | | | | |
|---|---|---|---|---|---|
| 3.1 | 10,130 | 21.3 | 23.9 | 27.2 | 0.4 |
| 5.0 | 9,523 | 21.1 | 24.5 | 27.8 | 0.4 |
| 9.9 | 7,389 | 18.9 | 27.8 | 21.7 | 0.4 |

The data in the above table show that hydroxypropylglycerol is an effective plasticizer for paper, being generally comparable to glycerol in effectiveness but having the advantages of greater permanence and lesser adverse effect on the tensile strength of the paper. These advantages were retained at higher degrees of plasticization; for instance, the weight loss on aging remained below 1% even when the plasticizer content of the paper was 20% or higher. This high degree of permanence is particularly valuable in highly plasticized papers, such as glassine.

A major advantage of hydroxypropylglycerol as a plasticizer for cellulosic materials is its relatively low hygroscopicity. This is desirable because it minimizes the changes in properties caused by changes of humidity and temperature of the environment. This property is illustrated by the data in Table II wherein the hygroscopicity of hydroxypropylglycerol is compared to that of glycerol and propylene glycol, two widely used plasticizers for cellulosic materials.

*Table II.—Equilibrium moisture content*

| Relative Humidity, Percent | Percent Moisture Content | | |
|---|---|---|---|
| | Hydroxypropylglycerol | Glycerol | Propylene Glycol |
| 20 | 2.5 | 6 | 7.5 |
| 40 | 6.5 | 15 | 15 |
| 60 | 9 | 27 | 27 |
| 80 | 24 | 44 | 47 |
| 90 | 38 | 56 | 67 |

We claim:
1. Paper containing an effective amount of a plasticizer consisting of 1,2,3-tris(2-hydroxypropoxy)propane.
2. Cellophane containing an effective amount of a plasticizer consisting of 1,2,3-tris(2-hydroxypropoxy)propane.

References Cited in the file of this patent

UNITED STATES PATENTS

| | | |
|---|---|---|
| 1,863,208 | Schorger | June 14, 1932 |
| 2,249,118 | De Witt | July 15, 1941 |
| 2,286,314 | Seymour et al. | June 16, 1942 |
| 2,486,024 | Hearne et al. | Oct. 25, 1949 |
| 2,520,671 | Wittcoff et al. | Aug. 29, 1950 |
| 2,527,970 | Sokol | Oct. 31, 1950 |
| 2,697,046 | Brandner | Dec. 14, 1954 |
| 2,728,688 | Wellisch | Dec. 27, 1955 |
| 2,839,419 | Windover et al. | June 17, 1958 |
| 2,927,918 | Anderson | Mar. 8, 1960 |